United States Patent [19]

Suehiro et al.

[11] Patent Number: 4,994,257
[45] Date of Patent: Feb. 19, 1991

[54] METHOD FOR PURIFYING HIGH-TEMPERATURE REDUCING GAS

[75] Inventors: Mitsugi Suehiro, Tokyo; Toshikuni Sera; Kenji Inoue, both of Hiroshima; Akira Shimada, Tokyo, all of Japan

[73] Assignee: Mitsubishi Jukogyo Kabushiki Kaisha, Tokyo, Japan

[21] Appl. No.: 41,868

[22] Filed: Apr. 23, 1987

[30] Foreign Application Priority Data

Apr. 24, 1986 [JP] Japan .................................. 61-93275
Mar. 13, 1987 [JP] Japan .................................. 62-56776

[51] Int. Cl.$^5$ ........................ B01D 53/04; C01B 17/06
[52] U.S. Cl. .................................. 423/577; 423/230; 423/231
[58] Field of Search ........................ 423/230, 231, 577

[56] References Cited

U.S. PATENT DOCUMENTS

| | | | |
|---|---|---|---|
| 1,822,293 | 9/1931 | Joseph | 423/230 |
| 1,971,815 | 8/1934 | Halvorsen | 423/577 |
| 2,747,968 | 5/1956 | Pigache | 423/230 |
| 4,533,529 | 8/1985 | Lee | 423/230 |

FOREIGN PATENT DOCUMENTS

| | | |
|---|---|---|
| 0122838 | 10/1984 | European Pat. Off. . |
| 2759049 | 7/1978 | Fed. Rep. of Germany . |
| 866757 | 5/1961 | United Kingdom . |
| 920681 | 3/1963 | United Kingdom . |
| 1183937 | 3/1970 | United Kingdom . |
| 1367941 | 9/1974 | United Kingdom . |
| 1444127 | 7/1976 | United Kingdom . |
| 1543477 | 4/1979 | United Kingdom . |

Primary Examiner—Jeffrey E. Russel
Attorney, Agent, or Firm—McAulay, Fisher, Nissen & Goldberg

[57] ABSTRACT

The present invention is directed to a method for purifying a high-temperature reducing gas by continuously circulating the processes of reducing a regenerated absorbent with the high-temperature reducing gas, until concentrations of aimed reducing gases have become uniform on upstream and downstream sides of the absorbent, and absorbing sulfur compounds by the use of this absorbent and thereby removing these sulfur compounds therefrom; the aforesaid method being characterized by using at least three reactors filled with the absorbent, by consisting of the four steps of reduction, absorption, $SO_2$ reduction and regeneration, and by comprising the steps of feeding a circulating gas from the regenerating step to the $SO_2$ reducing step; converting an $SO_2$ gas produced in the regenerating step and the $SO_2$ reducing step into elemental sulfur and recovering the latter as liquid sulfur; and introducing a part of the $SO_2$ gas into the reducing step and returning the remaining $SO_2$ gas to the regenerating step.

2 Claims, 8 Drawing Sheets

METHOD FOR PURIFYING HIGH-TEMPERATURE REDUCING GAS

FIELD OF THE INVENTION AND RELATED ART STATEMENT

The present invention relates to a method for purifying a high-temperature reducing gas, for example, a method for rationally removing sulfur compounds such as hydrogen sulfide and carbonyl sulfide from a high-temperature reducing gaseous mixture such as a gas produced by a coal gasifier.

In recent years, as results of the exhaustion of petroleum resources and the rise in its prices, much attention is paid to various fuels (or raw materials), and the utilization technique of coals and heavy oils (tar sand, shale oil, Maya crude oil, residual oil under reduced pressure, and the like) has been now developed. As typical examples, the coals and heavy oils are gasified, and the resultant gases are employed as a fuel for the generation of electricity, as other fuels and as raw materials for chemical synthesis.

However, the gas produced by the gasification contains sulfur compounds such as hydrogen sulfide and carbonyl sulfide at a concentration of several hundreds to several thousands of parts per million, depending on a kind of coal or heavy oil which is a raw material. These sulfur compounds are required to be removed therefrom in order to inhibit environmental pollution, and to prevent device members on the downstream side from corroding and a catalyst from being poisoned.

As such removal techniques, there are a wet process and a dry process.

In the wet process, it is necessary to cool a treated gas, which fact is disadvantageous in point of an energy economy. In addition, facilities for a pretreatment and a waste liquid treatment are required for the sake of the removal of concomitant components (tar, naphthalene, halogens, $NH_3$, $HCN$, dusts and the like) and for the sake of the prevention of a pollution and a degradation of an absorbing liquid. In short, constitutional steps of the wet process are intricate.

On the other hand, the dry process is advantageous from the viewpoint of an energy economy, and a constitution of treating steps is simple. For this reason, in the dry process, it is usually carried out to remove sulfur compounds therefrom by absorbing them as sulfides at a high temperature by the use of an absorbent the main component of which is a metallic oxide. The usable absorbents include metallic oxides of Fe, Zn, Mo, Mn, Cu, W and the like, and this absorbent will be allowed to react with $H_2S$ and $COS$ at a temperature of 250° to 500° C. Now, an explanation of the absorbing reactions will be made, taking $Fe_2O_3$ as an example. It is considered that the absorbing reactions progress in accordance with the following formulae (1) to (7):

$$Fe_2O_3 + H_2 \rightarrow 2FeO + H_2O \quad (1)$$

$$3Fe_2O_3 + H_2 \rightarrow 2Fe_3O_4 + H_2O \quad (2)$$

$$Fe_2O_3 + CO \rightarrow 2FeO + CO_2 \quad (3)$$

$$3Fe_2O_3 + CO \rightarrow 2Fe_3O_4 + CO_2 \quad (4)$$

$$FeO + H_2S \rightarrow FeS + H_2O \quad (5)$$

$$Fe_3O_4 + H_2 + 3H_2S \rightarrow 3FeS + 4H_2O \quad (6)$$

$$Fe_3O_4 + CO + 3H_2S \rightarrow 3FeS + 3H_2O + CO_2 \quad (7)$$

Afterward, the absorbent which has undergone the absorbing reactions is regenerated into the metallic oxide by a gas containing oxygen in accordance with a reaction of the following formula (8):

$$4FeS + 7O_2 \rightarrow 2Fe_2O_3 + 4SO_2 \quad (8)$$

The sulfur compounds in the high-temperature reducing gas are removed as a sulfur dioxide gas, by the cycle of the absorbing reactions and the regenerating reaction.

The absorbent used in this process may be prepared by molding the above-mentioned metallic oxide alone or a heat-resistant porous material carrying the metallic oxide therein into the shape of a sphere or a rod for a moving bed system, and into the shape of a honeycomb for a fixed-bed system.

Since the purified gas prepared by removing the sulfur compounds from a reducing gas such as a coal-gasified gas will be utilized as an energy source, it is preferred that concentrations of CO and $H_2$ are stable in the manufacturing process. In order to obtain such a stable process, the reactions of the above formulae (1) to (4) must be inhibited as much as possible.

In the moving bed system, the absorbing step and the regenerating step are continuously circulated, and therefore the above technical problem is easy to overcome. However, in the fixed-bed system, the absorbing step and the regenerating step are intermittently circulated. In consequence, at the beginning of the absorbing reaction subsequent to the absorbent recovery, the concentrations of CO and $H_2$ in the purified gas diminish temporarily, which phenomenon is practically unpreferable for the purification method of the high-temperature reducing gas.

In view of such a situation, the inventors of the present invention have suggested a method for purifying a high-temperature reducing gas in which three reactors of the fixed-bed system are switched to three steps in turn (Japanese Patent Application No. 85412/1985). That is, it is a method for removing sulfur compounds from a high-temperature reducing gas by absorbing the sulfur compounds with an absorbent the main component of which is a metallic oxide, in order to stabilize the concentration of reducing gases in the purified gas. This is accomplished by continuously (a) repeating the steps of regenerating the absorbent containing the absorbed sulfur compounds with an oxygen-containing gas; (b) reducing the regenerated absorbent with the high-temperature reducing gas, until the concentrations of the desired reducing gases have become uniform on the upstream and downstream sides of the absorbent; and (c) removing the sulfur compounds from the hightemperature reducing gas by flowing the gas through the absorbent.

In the aforesaid method, in order to prevent a volume of the treated gas from decreasing with time, the recovery reaction of the formula (8) is usually accomplished in succession in the circulating system, whereby the regenerated $SO_2$ gas is concentrated and the resultant sulfur is then recovered and removed therefrom. However, in this method, since the absorbent is brought into contact with the regenerated gas containing about 4 to about 12% of $SO_2$ in a high-temperature of 300° to 900° C, and the by-product $SO_3$ increased, the absorbent is under extremely severe conditions. As a result, there still remains the problem that the absorbent cannot withstand a long-term use.

On the other hand, in a conventional purification method for the high-temperature reducing gas, for the purpose of recovering sulfur from the regenerated $SO_2$ gas, there is used, as a reducing agent, a coal, a coke or the like, or a reducing gas (CO, $H_2$ or the like) and a reducing catalyst (Co-Mo series or the like), the Claus catalyst or the like. These metals are intricate, and so the operation maintenance is not easy.

Further, temperatures of the treated gas at the absorbing step and the regenerating step are generally within the range of 300° to 500° C and the range of 500° to 900° C respectively, and a gap between these temperatures is large. Consequently, in the conventional fixed-bed system, when the absorbing step is switched to the regenerating step, a temperature in the beginning of the regenerating step is insufficient, until a certain treating temperature has been reached. This fact results in decrease of the absorbing performance and has a bad influence on the absorbent, which will lead to the deterioration in the absorbent in a long period of time.

Furthermore, a pressure release step is necessary whenever the absorbing step is switched to the regenerating step, and it is also necessary to prevent a contamination with the $SO_2$ gas from a reactor after the regeneration. For this reason, an operation for reducing the pressure must be carried out for a certain period of time so as to purge the $SO_2$ gas from the regeneration system, before the switch of the regenerating step to the reducing step. This operation requires an accurate control and thus it is troublesome.

OBJECT AND SUMMARY OF THE INVENTION

The present invention intends to eliminate the drawbacks of the above conventional method for purifying a high-temperature reducing gas, and its object is to provide a method by which an energy economy can be further improved and by which the elemental sulfur, can be recovered with a high efficiency.

The present invention is directed to (1) a method for purifying a high-temperature reducing gas by continuously circulating the steps of reducing a regenerated absorbent with the high-temperature reducing gas, until concentrations of desired reducing gases have become uniform on the upstream and downstream sides of the absorbent, and absorbing sulfur compounds such as hydrogen sulfide and carbonyl sulfide contained in the high-temperature reducing gas by the absorbent and thereby removing these sulfur compounds therefrom; the aforesaid method being characterized by using at least three reactors packed with the absorbent, by consisting of the four steps of reduction, absorption, $SO_2$ reduction and regeneration, and by comprising the steps of feeding a circulating gas from the regeneration step to the $SO_2$ reducing step; converting an $SO_2$ gas produced in the regenerating step and the $SO_2$ reducing step into elemental sulfur and recovering the latter as liquid sulfur; and introducing a part of the $SO_2$ gas into the reducing step and returning the remaining $SO_2$ gas to the regenerating step. Moreover, the present invention is directed to (2) a method for purifying a high-temperature reducing gas which is characterized by adding the high-temperature reducing gas to be purified to the gas circulating from the regenerating step to the $SO_2$ reducing step in the above invention (1), in order to raise a temperature of the gas up to a level necessary for the $SO_2$ reducing step by combustion reactions with oxygen in the circulating gas.

The absorbent used in the absorbing step is a metallic oxide. In the absorbing step, the absorbent absorbs sulfur compounds such as $H_2S$ and COS contained in the high-temperature reducing gas in order to be converted into a sulfide. When the sulfide is brought into contact with an $SO_2$ gas, it is oxidized and thereby regenerated to the form of the original absorbent, and at this time the $SO_2$ gas is reduced to elemental sulfur.

According to the present invention, in the $SO_2$ reducing step, the $SO_2$ gas produced in this step and the $SO_2$ gas from the recovery process are brought into contact with the absorbent having the morphology of the sulfide, so that the absorbent is regenerated into the original metallic oxide and the $SO_2$ gas is converted into elemental sulfur, which is then recovered. On the other hand, the by-product $SO_3$ gas formed in this step is reduced to the $SO_2$ gas.

The gas which has undergone the treatment in this $SO_2$ reducing step is returned to the regenerating step and the reducing step, but concentrations of the $SO_2$ gas and the $SO_3$ gas which will be introduced into the regenerating step and the reducing step are low. In consequence, the durability of the absorbent can be improved and the corrosion of the apparatus can be inhibited.

The reaction in the above-mentioned $SO_2$ reducing step makes progress at a temperature as high as a level of 600° to 1,000° C, and it is to be noted that the higher the temperature in this step is, the greater the amount of produced elemental sulfur is. In order to secure a desired temperature in the $SO_2$ reducing step, the present invention makes use of a combustion heat of the undermentioned gaseous sulfur, a heat from the regenerating step, and a heat of the combustion reaction between the combustible gases such as CO and $H_2$ and oxygen which are provided by introducing a part of the high-temperature reducing gas containing the above combustible gases into the circulating gas line in the $SO_2$ reducing step.

According to the present invention, a part of the high-temperature reducing gas is added, whereby an amount of the regenerated elemental sulfur is easy to control in the $SO_2$ reducing step, and optimum conditions for the load variety of the high-temperature reducing gas volume and its sulfur compounds concentration can be controlled only by changing the temperature of $SO_2$ reducing reactions and the concentration of circulating $SO_2$.

DETAILED DESCRIPTION OF THE PREFERRED EMBODIMENTS

A method of the present invention will be described as embodiments in reference to accompanying drawings. In this description and in the different drawings, similarly numbered apparatus elements are the same.

Figure 1:
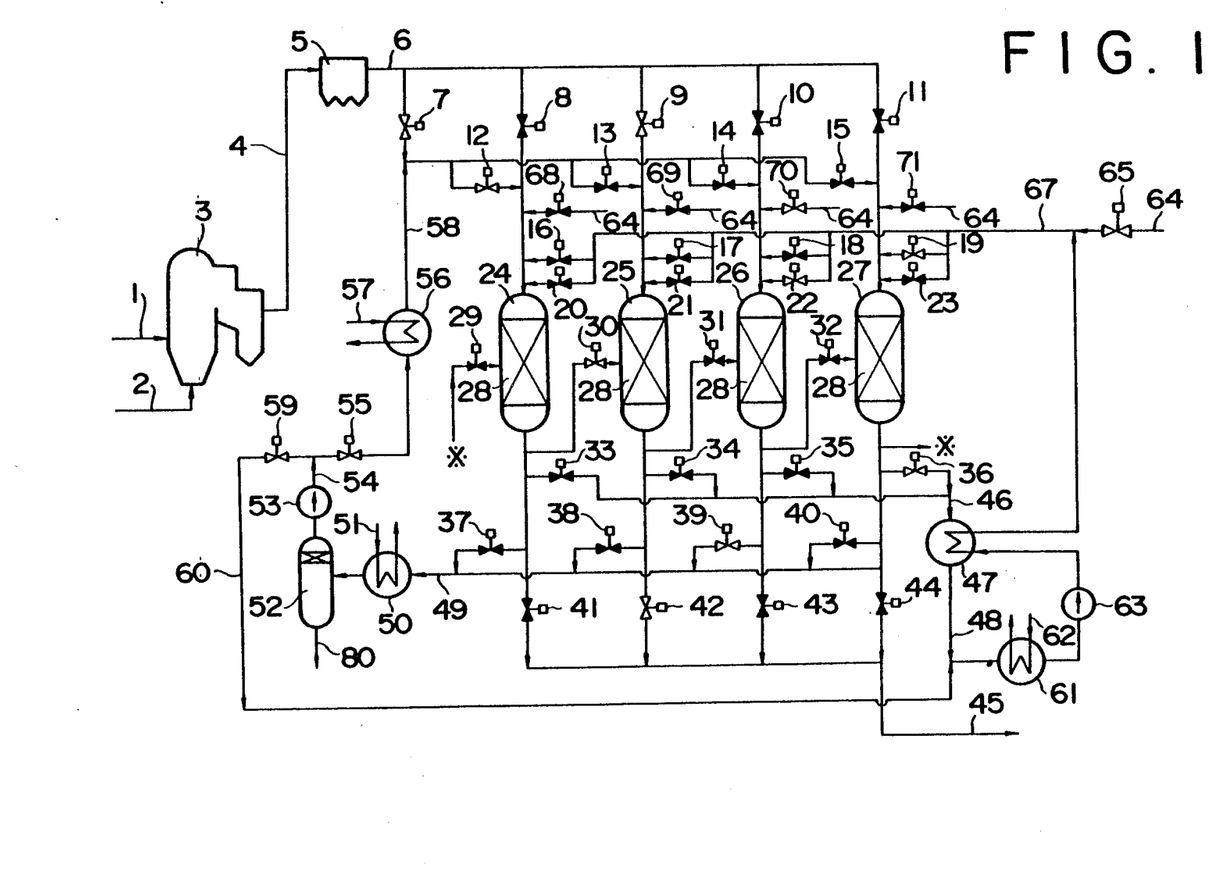
FIGS. 1 to 7 are flow charts for the explanation of embodiments of the present invention.

In FIG. 1, a coal 1 is partially burned and thereby gasified with the aid of a small amount of air or oxygen 2 in a gasifier 3 in order to obtain a crude gas 4 in which main components are $H_2$ and CO. This crude gas 4 is delivered to a dust collector 5, in which the dust in the gas is sufficiently removed therefrom up to a level of about 10 mg/$Nm^3$, and the dust-free gas 6 is fed to, for example, a reactor 25 in an absorbing step.

The dust-free gas 6 contains $H_2S$, COS, and $NH_3$ in amounts of several tens to several thousands of parts per million and traces of HF, HCl and the like in addition to the dust, depending on the kind of coal used and the gasification conditions. The temperature of the gas recovered is heated up to a level of 250° to 500° C by a steam heater at an outlet of the gasifier 3, and the pressure of the gas is within the range of atmospheric pressure to 25 kg/$cm^2$G, depending on a type of the used gasifier 3.

FIG. 1 shows a fixed-bed system embodiment which is composed of reactors 24, 25, 26, and 27 filled with an absorbent 28 and having the same structure. In the respective reactors 24, 25, 26, and 27, the reducing step according to formulae (1) to (4), an absorbing step according to formulae (5) to (7), and $SO_2$ reducing process and a regenerating step according to formulae (9) to (14), and the above-mentioned formula (8), respectively take place. These reactors effect these steps, in turn, by switching. However, the present invention is not limited to the fixed-bed system but is additionally applied to a fluidized bed system and a moving bed system, in so far as each of them comprises the circulation of first absorbing sulfur compounds, such as $H_2S$ and COS in a reducing gas with an absorbent in order to remove them therefrom, and then regenerating the absorbent by the formula (8). Further, the present invention can be applied to multi-reactor fixed-bed systems having three or more reactors in which gas flow paths can be switched, in addition to the above four reactors fixed-bed system. Furthermore, the inventive method is not dependent on the composition and shape of the absorbent.

Now, reference will be made to an embodiment in which there are carried out the reducing step in the reactor 24, the absorbing step in the reactor 25, the $SO_2$ reducing step in the reactor 26, and the regenerating step in the reactor 27.

A conventional technique comprises the three steps of reduction, absorption and regeneration, but the present invention comprises the four steps of reduction, absorption, $SO_2$ reduction and regeneration. That is, in the present invention, the $SO_2$ reducing step is additionally increased. In this $SO_2$ reducing step, an $SO_2$ gas formed in this step itself and an $SO_2$ gas formed in the regenerating step are converted into elemental sulfur by the absorbent and the thus obtained sulfur is then recovered. In addition thereto, a secondarily produced $SO_3$ gas present in the $SO_2$ gas is reduced to the $SO_2$ gas, and a part of the treated gas is introduced into the reducing step and the remaining gas is returned to the regenerating step.

When the dust-free gas 6 is led to the reactor 25 via a flow path switch valve 9, the sulfur compounds are usually absorbed by the absorbent 28 in accordance with formulae (5) to (7) at a reaction temperature of 300° to 500° C and are thereby removed therefrom. The treated gas which is free from the sulfur compounds is fed as a purified gas 45 to a gas turbine on the downstream side via a flow path switch valve 42.

In the reducing step, reducing reactions are performed as a pretreatment of the absorbing step in accordance with the formulae (1) to (4). That is, in this step, a part of the dust-free gas 6 is forwarded to the reactor 24 filled with the regenerated absorbent 28 via a flow path switch valve 12 under the adjustment of the gas flow, and then the reducing treatment of the absorbent 28 is carried out at about the same reaction temperature as in the above-mentioned absorbing step. The treated gas from the reactor 24 is fed to a middle portion of the reactor 25 for the absorbing step via a flow path switch valve 30. This reason of such a feeding operation will be elucidated below.

The $SO_2$ reducing step is a step which follows the absorbing step. In this $SO_2$ reducing step, a predetermined amount of the regenerated $SO_2$ gas is introduced into the reactor 26 through a circulating gas line 67 and via a flow path switch valve 22.

Since in the recovery step, the following reactions of formulae (9) to (11) partially take place in addition to the reaction of the formula (8), gaseous sulfur ($S_2$) is contained in the above regenerated $SO_2$ gas. Sulfur oxides ($SO_2$ and $SO_3$) present in this gas are reduced by the absorbent 28 in the absence of $O_2$ in accordance with the following formulae (9) to (14):

$$4FeS + 2SO_2 \rightarrow 4FeO + 3S_2 \tag{9}$$

$$6FeS + 4SO_2 \rightarrow 2Fe_3O_4 + 5S_2 \tag{10}$$

$$8FeS + 6SO_2 \rightarrow 4Fe_2O_3 + 7S_2 \tag{11}$$

$$FeS + 3SO_3 \rightarrow FeO + 4SO_2 \tag{12}$$

$$3FeS + 10SO_3 \rightarrow F_3O_4 + 13SO_2 \tag{13}$$

$$2FeS + 7SO_3 \rightarrow Fe_2O_3 + 9SO_2 \tag{14}$$

At the beginning of the $SO_2$ reduction, the dust-free gas 6 still remains in the reactor 26, but even if operation is made under such a situation, there exists no problem in the $SO_2$ reduction, and a gas purge, a gas replacement and the like in the system are unnecessary.

A feed rate of the regenerated $SO_2$ gas to be delivered to the $SO_2$ reducing step is preferably within the range of about 20 to 50% with respect to that of the circulating gas 67. The desired amount of $SO_2$ in the gas is converted into elemental sulfur, under the reaction temperature of 600° to 1,000° C, and the SV value (gas flow rate $Nm^3$/h/absorbent volume $m^3$) of about 100 to about 1,000 $h^{-1}$.

After the absorbing step has been switched to the $SO_2$ reducing step, at the beginning of the step, a temperature of the absorbent 28 in the reactor 26 is usually within the range of 300° to 500° C, which level is lower than a temperature for the reducing reaction of $SO_2$. When under this low temperature condition, the regenerated $SO_2$ gas containing $O_2$ coming from the regeneration system is introduced to the $SO_2$ reducing step reactions represented by the following formulae (15) to (18) are performed in the presence of $O_2$ in order to secondarily produce sulfates such as ferrous sulfate and ferric sulfate. These sulfates are undesirable since they adversely affect the quality of the absorbent 28.

$$FeS + 2O_2 \rightarrow FeSO_4 \tag{15}$$

$$2FeS + SO_2 + 5O_2 \rightarrow Fe_2(SO_4)_3 \tag{16}$$

$$2Fe_2SO_3 + 4SO_2 + O_2 \rightarrow 4FeSO_4 \tag{17}$$

$$2Fe_2SO_3 + 6SO_2 + 3O_2 \rightarrow 2Fe_2(SO_4)_3 \tag{18}$$

Therefore, it is important to start the operation of the $SO_2$ reduction, taking the following matters into consideration so as not to secondarily produce the above-mentioned sulfates.

That is, since an $O_2$ concentration in the gas 46 coming from the reactor 27 of the regeneration system is nearly zero, the regenerated $SO_2$ gas 67 containing no $O_2$ can be fed to the $SO_2$ reduction system, if among flow path switch valves 65, 70, and 71, the valves 65 and 70 are closed and the valve 71 is opened in the $SO_2$ reduction system and the regeneration system. According to this manner, at the beginning of the $SO_2$ reducing operation, the regenerated $SO_2$ gas 67 containing no $O_2$ can be introduced thereinto through the flow path switch valve 22 and the reactions of the formulae (9) to (14) can be carried out.

When a temperature in the reactor 26 has reached 600° C or more by a retention heat of the regenerated $SO_2$ gas, the regenerated gas containing $O_2$ is introduced into the system, so that the usual $SO_2$ reducing operation is carried out.

In the $SO_2$ reducing step, the gas contains no $O_2$, and the higher its reaction temperature is within the range of 600° to 1,000° C, the higher the performance of the $SO_2$ reduction is. However, as a temperature of the gas introduced into the reactor 26 is elevated, problems regarding the design technique of the apparatus and an economy are posed. Therefore, it is desirable that the temperature of the gas to be introduced into the reactor is lowered so as not to lead to the deterioration in performance and quality of the absorbent.

Accordingly, the temperature of the gas introduced into the reactor 26 should be at the lowest possible level in so far as by-products such as ferrous sulfate and ferric sulfate are not formed. When it is needful that air or the gas 64 containing oxygen is added to the gas with the intention of raising a temperature in the reactor 26, an amount of air or the gas 64 should be limited as small as possible.

That is, when a predetermined amount of air or the oxygen-containing gas 64 is added via the flow path valve 70 to the regenerated $SO_2$ gas which will be introduced into the $SO_2$ reducing step, the reactions of the following formulae (19) and (8) take place at the inlet and in the interior of the reactor 26. Since these reactions all are exothermic, a temperature in the reactor 26 is raised up to a desired level, whereby a practical $SO_2$ reduction can be accomplished.

$$S_2 + 2O_2 \rightarrow 2SO_2 \tag{19}$$

Now, the treated gas 49 coming from the $SO_2$ reducing step is cooled to a temperature of 200° C or less in a sulfur condenser 50, and elemental sulfur is recovered as liquid sulfur and is then stored in a separator 52. Afterward, the recovered sulfur is discharged through a line 80. A part of the sulfur-free treated gas 54 is fed to the reactor 24 of the reducing step via a flow path switch valve 55, a heat exchanger 56 and the flow path switch valve 12 in an amount corresponding to that of air or the oxygen-containing gas 64 introduced into the $SO_2$ reduction system and the regeneration system.

As is definite from FIG. 1, in the $SO_2$ reducing step and the regenerating step, the gas to be treated is circulated, and air or the oxygen-containing gas 64 is introduced from the outside into the $SO_2$ reducing step and the regenerating step. As a result, gases such as $N_2$ and $H_2O$ other than the $O_2$ gas which has been consumed in the combustion of sulfur and the regeneration reactions therein are accumulated in this circulating system. Therefore, it is necessary to draw out these gases from the circulating system (to the reducing step) as much as an amount corresponding to that of the added air or oxygen-containing gas 64 in order to keep up a component balance in the circulating system.

Further, the remaining treated gas 60 (the treated gas left by subtracting a partial treated gas 58 fed to the reducing step from the treated gas 54 from which elemental sulfur has already been removed in the $SO_2$ reducing step) is returned to a circulating gas line 48 via a flow path switch valve 59.

Hereupon, the treated gas 58 which is being fed to the reducing step is mixed with a part (the gas delivered through a flow path switch valve 7) of the dust-free gas 6, so that residual $SO_2$ and gaseous sulfur in the gas 58 are converted into an $H_2S$ gas in the presence of the absorbent 28 in accordance with the following formulae (20) to (22) in the reactor 24:

$$SO_2 + 3H_2 \rightarrow H_2S + 2H_2O \tag{20}$$

$$SO_2 + 3CO + H_2O \rightarrow H_2S + 3CO_2 \tag{21}$$

$$1/x\, S_x + H_2 \rightarrow H_2S \ (x = 2 \text{ to } 8) \tag{22}$$

Most of the produced $H_2S$ is absorbed in the reactor 24, but the unabsorbed $H_2S$ is still present in the gas coming from the reducing step. For the purpose of absorbing and removing it, the gas coming from the reducing step is fed to a middle position of the reactor 25 in the absorbing step, and the fed gas is treated together with the gas 6 fed thereto, so that the sulfur compounds are absorbed and the gas therein is thereby purified.

After the $SO_2$ reducing reactions, the absorbent 28 is regenerated by air or the oxygen-containing gas 64 in the regenerating step, but the regenerating operation is preferably carried out in the circulating system so as to decrease the regenerating gas volume. The regeneration of the absorbent 28 is carried out at a reaction temperature within the range of 500° to 900° C in accordance with the formula (8).

When the $SO_2$ reducing step is switched to the regenerating step, the reactor 26 has a temperature of 500° C or more. Therefore, this step switch can be achieved smoothly without any trouble to the absorbent 28.

In the regenerating step, the necessary air or oxygen-containing gas 64 coming through the flow path valve 65 is introduced into the regenerated circulating gas 67 a temperature of which has been raised to a predetermined regeneration level in a heat exchanger 47. Afterward, the circulating gas 67 containing $O_2$ is fed to the reactor 27 via a flow path switch valve 19, and the absorbent 28 is regenerated therein.

The regenerated circulating gas 46 discharged therefrom is cooled in the heat exchanger 47, is mixed with the treated gas 60 from which sulfur has been removed in the $SO_2$ reducing step, is further cooled, by a cooler 61, to a temperature which a circulating blower 63 accepts; and is then circulated by the blower 63.

In the regenerating step, an $SO_2$ concentration in the circulating gas is usually from 8 to 12 vol %, but since a part of the regenerated gas has been treated in the $SO_2$ reducing step, an $SO_2$ concentration in the regenerated circulating gas 67 is as low as a level of about 1.5 to about 7 vol %. In other words, concentrations of $SO_2$ and $SO_3$ in this gas are no more than about 1/7 to about ⅔ of those in a conventional technique. This fact is effective to improve the durability of the absorbent 28 and to inhibit the corrosion of the apparatus.

As is apparent from the reactions of the formulae (9) to (14) performed in the $SO_2$ reducing step, the absorbent 28 is almost all regenerated by the reactions with $SO_2$ and $SO_3$ in the treated gas even in the absence of $O_2$, and therefore it is possible to remarkably decrease an amount of air or the oxygen-containing gas 64 which is used for the regeneration of the absorbent 28 in the regenerating step. As compared with the conventional technique for regenerating the absorbent 28, a volume of air can be diminished as much as 40 to 50%, which fact greatly contributes to the saving of the electric power consumption in a dry gas purification.

Figure 2:
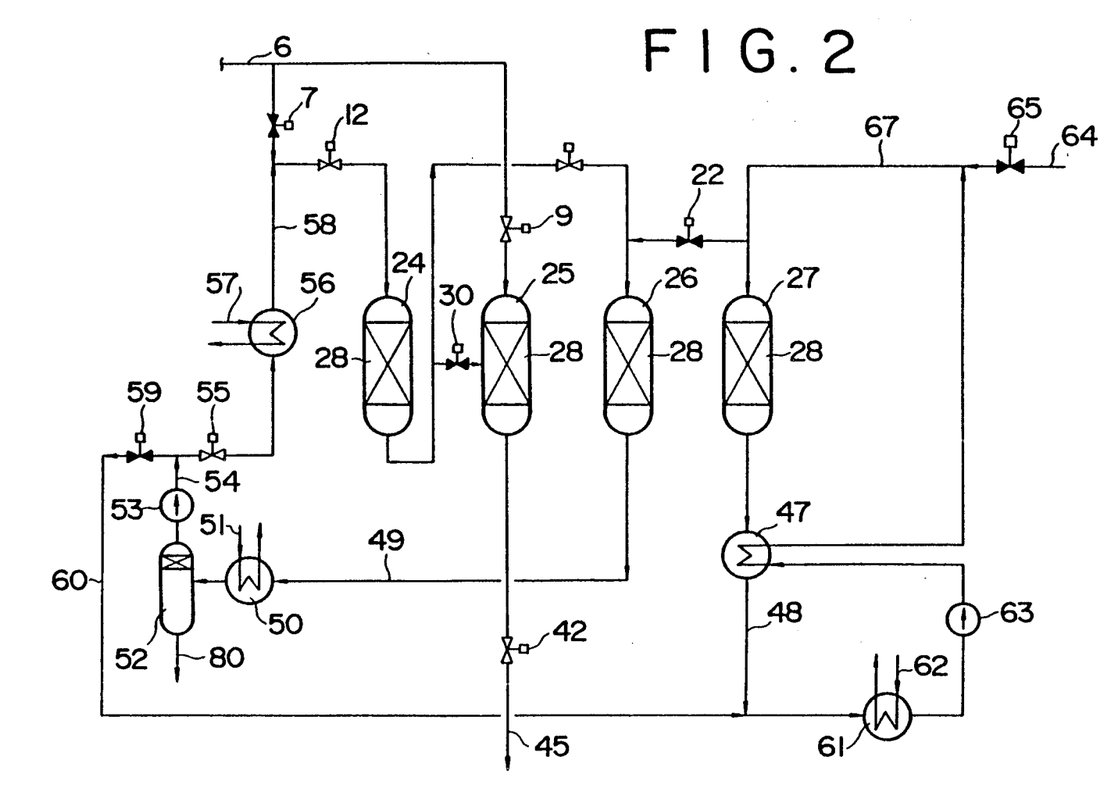

FIG. 2 shows a partial flow chart for mainly elucidating the transition from the regenerating step to the reducing step.

In the conventional technique, sulfur oxides such as $SO_2$ and $SO_3$ in the regeneration system must be purged, before the transition from the regenerating step to the reducing step. If not so, these remaining sulfur oxides cannot be removed sufficiently at the beginning of the reducing step in the reactor 24 for reduction and in the reactor 25 for absorption. Accordingly, in such a conventional case, a pressure in the regeneration system is released, for example, from 20 kg/cm²G to 0-3 kg/cm²G prior to the transition from the regenerating step to the reducing step, and the operation is carried out under such a reduced pressure in order to purge the sulfur oxides in the system. Afterward, the reactor 24 is filled with the dust-free gas 6 by adjusting the flow path valves 7 and 12, till a predetermined pressure has been reached therein, and the operation is then carried out. This conventional procedure is very troublesome to control.

The present invention permits the transition from the regenerating step to the reducing step without reducing a pressure in the regeneration system and without operating under a reduced pressure.

In FIG. 2, when the regenerating step is switched to the reducing step, for a while from the beginning of the reduction, the flow path switch valves 7, 22, 30, 59 and 65 are closed, and the reactors 24 and 26, the sulfur condenser 50, the separator 52, the heat exchanger 56 and the line of the reactor 24 are closed so as to form a closed loop, and under these conditions, a gas circulation is carried out by means of the blower 53. As a result, the sulfur oxides such as $SO_2$ and $SO_3$ which are still left in the reactor 24 are finally converted into elemental sulfur in accordance with the reactions of the formulae (9) to (14) in the reactor 26. The treated gas 49 coming from the reactor 26 is cooled to 200° C or less by means of the sulfur condenser 50 in order to recover elemental sulfur in a liquid state, and the latter is then stored in the separator 52.

The elemental sulfur-free treated gas 54 is passed through the heat exchanger 56 by the blower 53 so as to be heated up to a necessary temperature, and is then recycled. This gas circulating operation permits removing the sulfur oxides from the reduction system.

In this connection, if the flow path switch valve 7 is opened for a short period of time in order to introduce a small amount of the dust-free gas 6 into this gas circulating system, the conversion reaction of the sulfur oxides makes progress in accordance with the formulae (20), (21), so that the purge of the sulfur oxides in the system is accelerated.

On the other hand, during the above treatment, the dust-free gas 6 is fed to the absorbing system (reactor 25) via the flow path switch valve 9 regardless of the above gas circulating operation, and the sulfur compounds in this gas are absorbed by the absorbent 28 and are thereby removed therefrom. The thus purified gas 45 is fed to a gas turbine on the downstream side via a flow path switch valve 42.

With regard to the regeneration system (the reactor 27), the flow path switch valve 65 is opened, and the gas circulating operation is carried out in the regeneration system (the reactor 27→the heat exchanger 47→the cooler 61→the blower 63→the heat exchanger 47→the reactor 27), with air or the oxygen-containing gas 64 shut out. After the purge of the sulfur oxides in the reduction system has been completed, the reduction, the $SO_2$ reduction and the regeneration operation return to normal.

By following the above-mentioned operation procedure, the transition from the regenerating step to the reducing step can be accomplished without any reduction of a pressure and without any operation under a reduced pressure.

Figure 3:
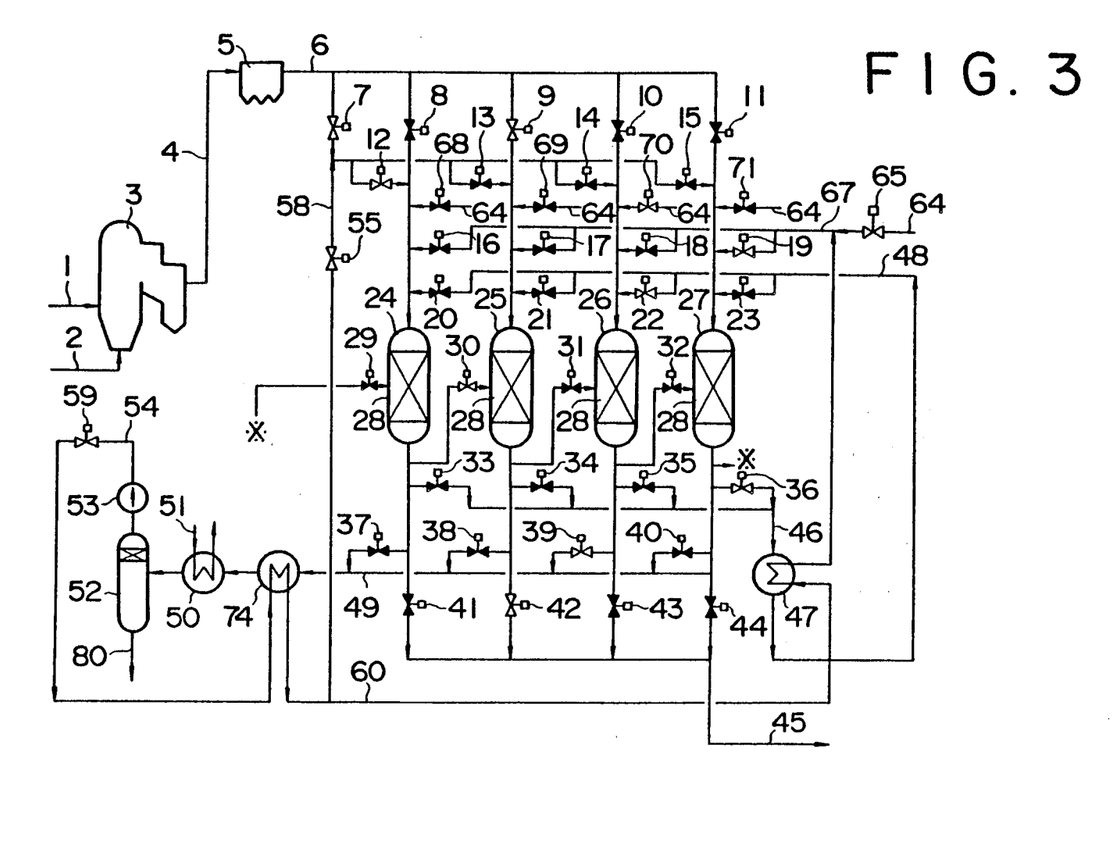

FIG. 3 shows a method of delivering the total amount of the regenerated gas coming from the regenerating step to the $SO_2$ reducing step. An embodiment shown in FIG. 3 performs the reducing step in the reactor 24, the absorbing step in the reactor 25, the $SO_2$ reducing step in the reactor 26 and the regenerating step in the reactor 27, as in FIG. 1, and the description of the same portions as in FIG. 1 will be omitted here.

In FIG. 3, at the beginning of the $SO_2$ reducing operation, the regenerated $SO_2$ gas 48 scarcely containing $O_2$ is introduced into the reactor 26 via the flow path switch valve 22, as in FIG. 1, and the reactions of the formulae (9) to (14) are carried out. When a temperature in the reactor 26 has reached 600° C or more by a retention heat of the regenerated $SO_2$ gas, the oxygen-containing regenerated gas is introduced into the system, and the usual $SO_2$ reducing operation is performed.

In this case, a concentration of $O_2$ in the regenerated $SO_2$ gas which is delivering to the $SO_2$ reducing step is suitably adjusted by controlling the flow path switch valve 70 for the air or oxygen-containing gas 64, as desired. Consequently, exothermic reactions of the formulae (19) and (8) take place at the inlet and in the interior of the reactor 26, as in FIG. 1 described above, so that it is not necessary that the temperature of the regenerated $SO_2$ gas introduced into the reactor 26 is fairly elevated. Such exothermic reactions can provide a practical temperature level.

The treated gas 49 coming from the SO₂ reducing step is cooled in the heat exchanger 74 and is further cooled to 200° C. or less by the sulfur condenser 50. The resulting elemental sulfur is recovered in a liquid state and is then stored in the separator 52. Afterward, the recovered sulfur is drawn out through the line 80.

The treated gas 54 from which elemental sulfur has been removed is heated by means of a heat exchanger 74, and a part of the gas 54 is then fed to the reactor 24 of the reducing step via the flow path switch valves 55 and 12 in an amount corresponding to air or the oxygen-containing gas 64 introduced into the SO₂ reduction system and the regeneration system. Further, the remaining treated gas 60 is led to the regeneration step.

In the regeneration step, the absorbent 28 is regenerated at a reaction temperature of 500° to 900° C in accordance with the reactions of the formulae (8) to (14) in the same manner, as in FIG. 1. The gas 60 coming from the SO₂ reduction system which will be introduced into the regeneration system is heated by the heat exchanger 47 up to a temperature necessary for the regeneration, and air or the oxygen-containing gas 64 is blown into the above gas 60 via the flow path switch valve 65. The mixed gas 67 is fed to the reactor 27 via the flow path switch valve 19, and the absorbent 28 is regenerated therein.

The gas 46 coming from the reactor 27 is cooled by the heat exchanger 47 and all of the cooled gas is then fed to the SO₂ reducing step.

In the regenerating step, a concentration of SO₂ in the gas 67 to be introduced into the reactor 27 is at a level of 1 to 5 vol % which is lower than in the embodiment shown in FIG. 1, since the whole volume of the regenerated gas has been treated in the SO₂ reducing step. In other words, concentrations of SO₂ and SO₃ in the gas 67 to be introduced into the reactor 27 are as low as about 1/10 to about ½ of those in the case of a conventional technique.

As compared with the embodiment shown in FIG. 1, the concentrations of sulfur oxides such as SO₂ and SO₃ in the gas 67 is lower, and the durability of the absorbent 28 and the prevention of the apparatus corrosion can be enhanced effectively.

Also in the embodiment shown in FIG. 3, the transition from the regenerating step to the reducing step can be accomplished without reducing a pressure and without operating under a reduced pressure, as described above in reference to FIG. 2.

Figure 4:
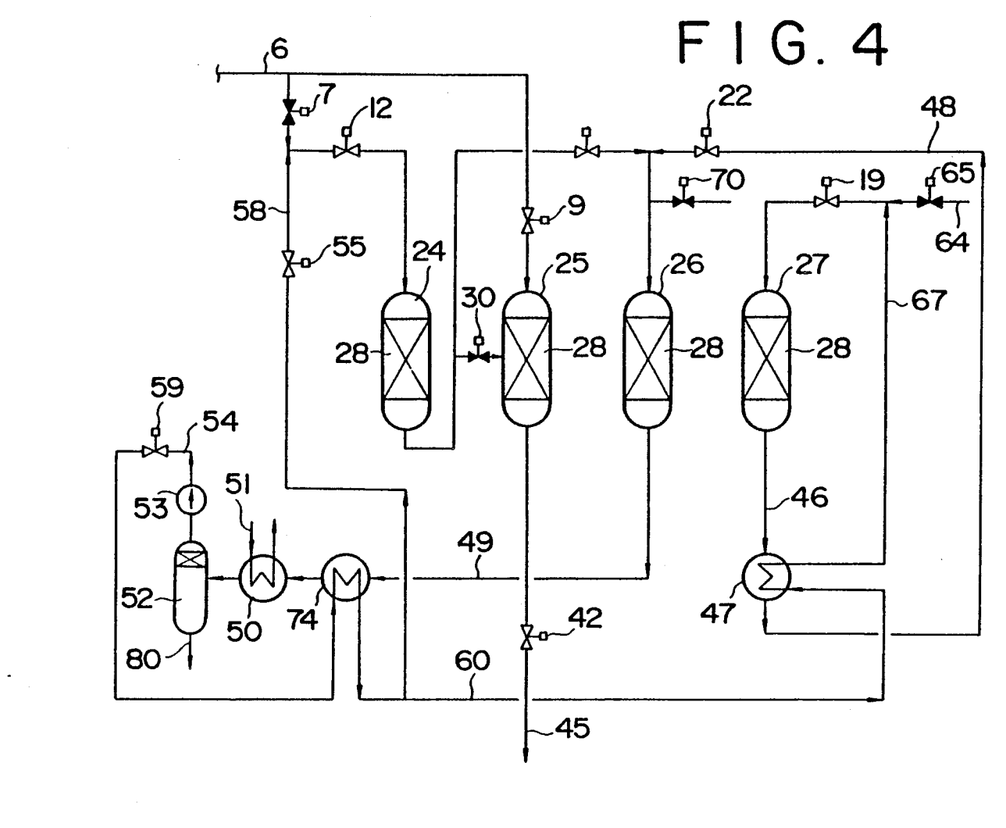

In FIG. 4, when the regenerating step is switched to the reducing step, for a while from the beginning of the reduction, the flow path switch valves 7, 30, 65 and 70 are closed, and the gas is circulated by the blower 53 along the following two loops:

(1) a line loop consisting of the reactor 24 for reduction, the reactor 26 for SO₂ reduction, the heat exchanger 74, the sulfur condenser 50, the separator 52, the heat exchanger 74 and the reactor 24, and (2) another line loop consisting of the reactor 26 for SO₂ reduction, the heat exchanger 74, the sulfur condenser 50, the separator 52, the heat exchanger 74, the heat exchanger 47, the reactor 27 for regeneration, the heat exchanger 47 and the reactor 26.

By this operation, the remaining sulfur oxides such as SO₂ and SO₃ in the reactor 24 are eventually converted into elemental sulfur by the reactions of the formulae (9) to (14) in the reactor 26. The treated gas 49 coming from the reactor 26 is cooled by means of the heat exchanger 74 and is further cooled to 200° C or less by the sulfur condenser 50. The resultant elemental sulfur is recovered as liquid sulfur and is then stored in the separator 52.

The treated gas 54 from which elemental sulfur has been removed is delivered by the blower 53 to the heat exchanger 74, in which the gas is heated, till its temperature has reached a desired level, and it is then recycled. This gas circulating operation permits removing the sulfur oxides from the reduction system.

As in the embodiment shown in FIGS. 1 and 2, if the flow path switch valve 7 is closed for a short period of time so as to blow a small amount of the dust-free gas 6 into the gas circulating system, the conversion reactions of the formulae (20) and (21) make progress, whereby the purge of the sulfur oxides in the system is further accelerated.

During this operation, the sulfur compounds in the dust-free gas 6 are absorbed by the absorbent 28 and removed therefrom in the absorption system (the reactor 25) regardless of the above-mentioned gas circulating operation, as in FIGS. 1 and 2. The thus purified gas 45 is then fed to a gas turbine on the downstream side.

After the purge of the sulfur oxides in the reduction system has been completed in this way, the reduction, the SO₂ reduction and the regeneration operation return to normal.

By following the above-mentioned operative procedure, also in the embodiments shown in FIGS. 3 and 4, the transition from the regenerating step to the reducing step can be achieved without reducing a pressure and without operating under a reduced pressure, as in the embodiments shown in FIGS. 1 and 2.

Incidentally, when the reactor 24, 25, 26 and 27 are in the reducing step, the absorbing process, the SO₂ reducing step and the regenerating step respectively, gas flow path switch valves 8, 10, 11, 13 to 18, 20, 21, 23, 29, 31 to 35, 37, 38, 40, 41, 43, 44 and 68, 69 and 71 are usually closed which have not been explained in reference to FIGS. 1 to 4. The gas flow path switch valve 71 is opened only at the time of the start of the SO₂ reduction operation.

Further, with regard to a cooling gas 62 in the cooler 61 disposed on the circulating line of the regenerated gas, a cooling water 51 in the sulfur condenser 50 disposed on the treated gas lines 49 and 58 extending from the SO₂ reducing step, and a high-temperature gas 57 in the heat exchanger 56, any materials can be employed in so far as they satisfy the requirements of heat exchange.

Although the fix-bed type four-reactor switching systems have been described hereinbefore in reference to FIGS. 1 to 4, a similar type three-reactor switching system can also be utilized to purify the high-temperature reducing gas in about the same manner in principle.

In the case of the fix-bed type three-reactor switching system, the regeneration operation and the reduction operation are carried out in one reactor.

Figure 5:
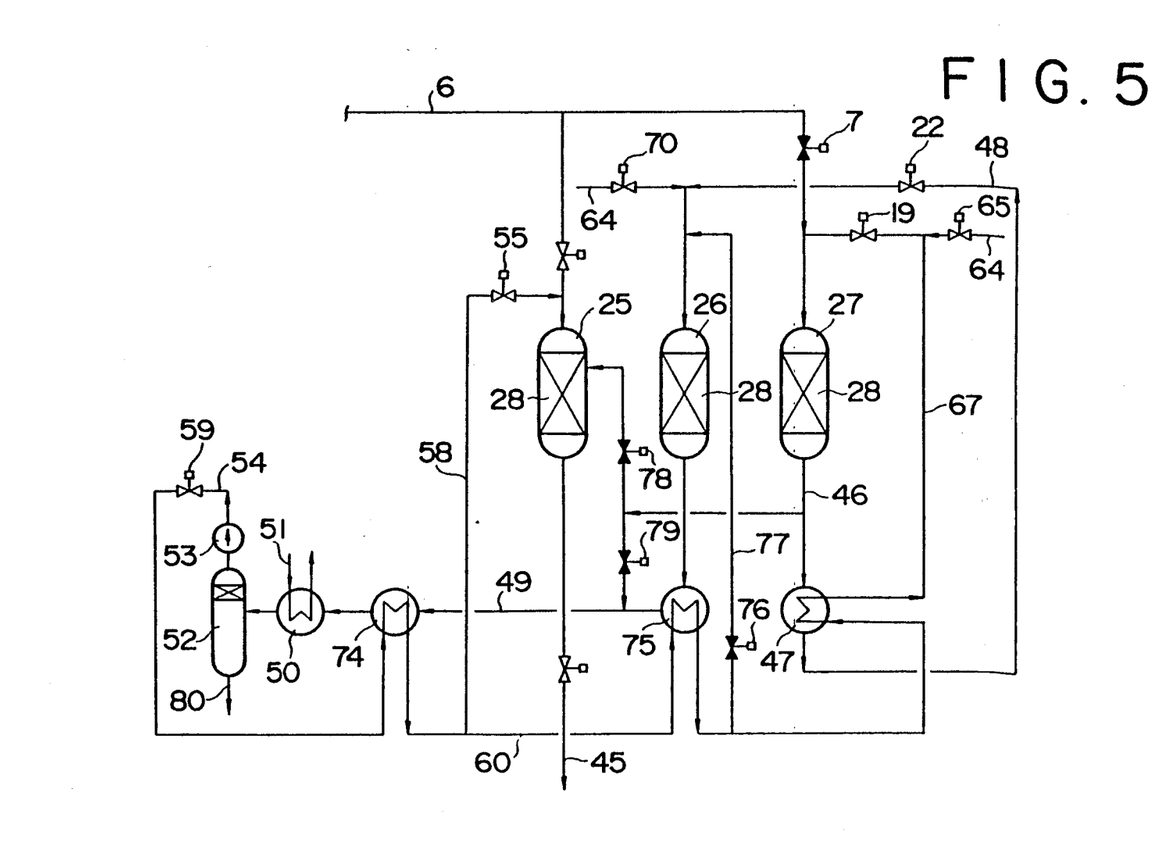

FIG. 5 shows its typical flow chart. As in FIGS. 1 to 4, on the assumption that the reactors 25, 26 and 27 are in the absorbing step, the SO₂ reducing step and the regenerating step respectively, reference to the operation of this system will be made. As for the absorbing step, the SO₂ reducing step and the regenerating step, their constitutions and functions are substantially similar to those of the fix-bed type four-reactor switching system. Therefore, different points therebetween will be mainly described.

In FIG. 5, the treated gas 54 from which elemental sulfur has been already removed in the SO₂ reduction system is heated by the heat exchanger 74, and a part of the gas 54 is then fed to the reactor 25 of the absorbing step through the gas line 58 via the flow path switch valve 55 in an amount corresponding to air or the oxygen-containing gas 64 introduced into the $SO_2$ reduction system and the regeneration system. On the other hand, the remaining treated gas 60 is further heated in the heat exchanger 75 and is then introduced into the regenerating step.

In the embodiment shown in FIG. 5, one tower of the reactor 27 is used for both the regeneration and the reduction operation. When the regenerating operation has been over, the flow path switch valves 7, 76 and 79 which have been closed during the regenerating step are opened, and the flow path switch valves 19, 22 and 65 around the reactor 27 are closed, whereby a small amount of the dust-free gas 6 is allowed to get into the reactor 27. Thus, the regenerating step is switched into the reducing step.

At the beginning of the reduction operation, the $SO_2$ gas formed during the regenerating step is still present in the reactor 27. Accordingly, as long as the $SO_2$ gas is coexistent with the other gas in the reactor 27, the gas 46 discharged from the reactor 27 is led to the gas circulating line 49 via the flow path switch valve 79. Even if the gas 46 contains combustible substances (CO, $H_2$ and the like), they will be burned in the $SO_2$ reduction system. After the remaining $SO_2$ gas has been removed from the reactor 27, the flow path switch valve 78 is opened and the valve 79 is closed so that the discharged gas 46 from the reactor 27 is fed to the reactor 25 of the absorbing step through the middle position thereof. Under such a constitution, the reactor 27 begins the normal reduction operation.

As understood from the above description, the three-reactor switching system is under a batch operation, since the one reactor effects the regeneration and the reduction, but the absorption operation and the $SO_2$ reduction operation are continuous. While the reduction operation is carried out, a part 58 of the elemental sulfur-free treated gas 54 is fed to the reactor 25 of the absorbing step, and the remaining gas 60 is heated by means of a heat exchanger 75 and is then returned to the reactor 26 of the $SO_2$ reducing step through the gas line 77 via the flow path switch valve 76. That is, when the reactor 27 performs the reducing step, the $SO_2$ circulating system constitutes a single circulation of the gas. In this case, the $SO_2$ gas is converted into elemental sulfur in the $SO_2$ reduction system, and the treated gas 58 containing $SO_2$ is allowed to stream to the reactor 25. In consequence, if the supply of $O_2$ is insufficient, the $SO_2$ gas in the circulating gas is gradually consumed, so that a balance of $SO_2$ is lost. Therefore, it is necessary to keep up the balance by feeding a certain amount of air or the oxygen-containing gas 64 corresponding to an $SO_2$ consumption to the reactor 26 via the flow path switch valve 70 in order to thereby perform the reaction of the formula (8). When the reducing step has been over, the reducing step is switched to the absorbing step, as in the embodiment of the four-reactor switching system described above, and after the new absorbing step has reached a steady state, the former absorbing step is switched to the $SO_2$ reducing step, and afterward the former $SO_2$ reducing step is further switched to the regenerating step.

In the embodiments shown in FIGS. 1 and 5, as a means for securing a temperature necessary for the $SO_2$ reducing step, air or the oxygen-containing gas is added to the regenerated $SO_2$ gas which is circulated through this step, in order to make use of the exothermic reactions of the formulae (8) and (19).

Another feature of the present invention is that as such a means, the high-temperature reducing gas which is to be purified by the present invention is added to the regenerated $SO_2$ gas which is circulated through the $SO_2$ reducing step, thereby utilizing a combustion heat by $H_2$ and CO in the reducing gas. This feature of the present invention will be described in reference to FIGS. 6 to 8.

Figure 6:
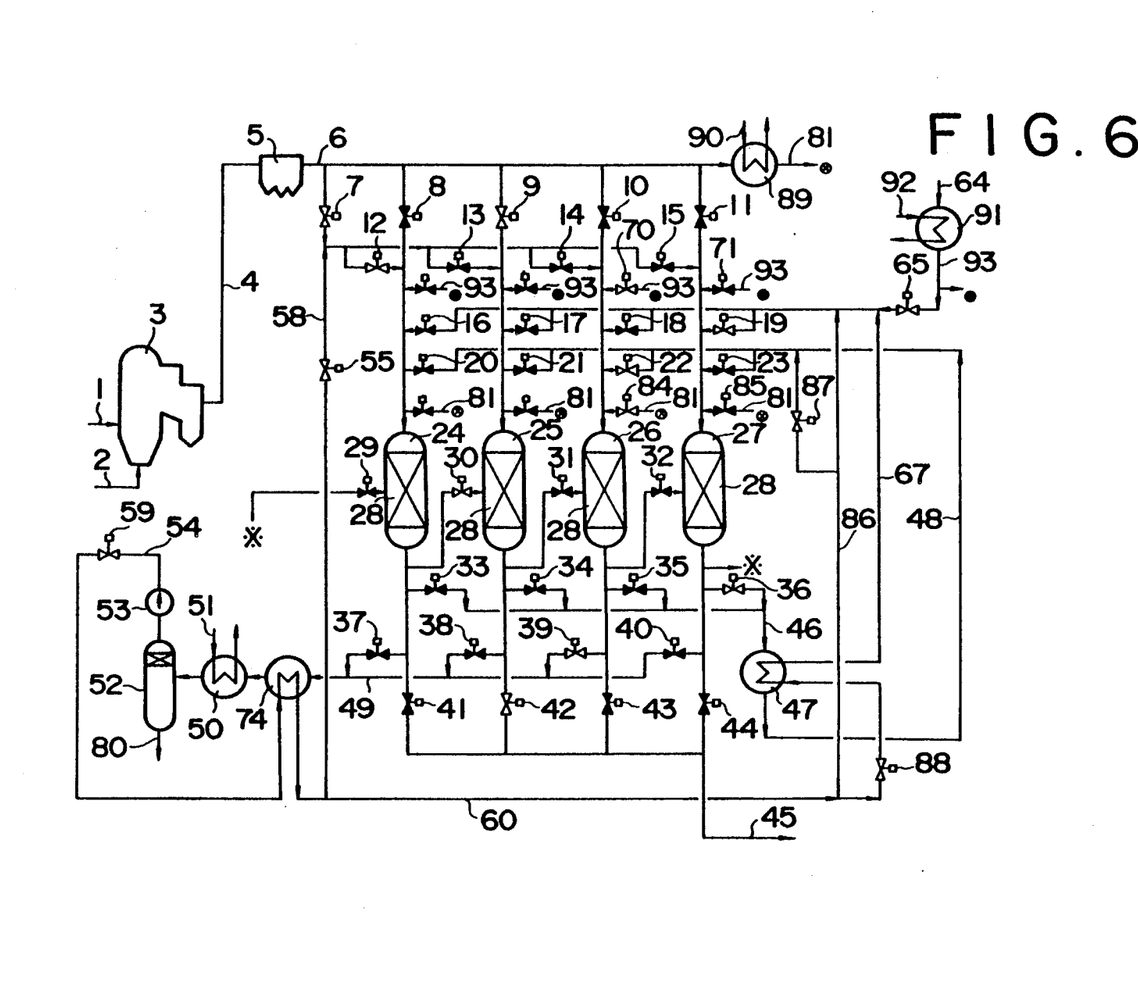

FIG. 6 shows an embodiment in which the above-mentioned means for adding the high-temperature reducing gas is incorporated into the four-reactor system shown in FIG. 1. With regard to the same members as in FIG. 1, explanation will be omitted.

In FIG. 6, the procedure at the beginning of the $SO_2$ reduction operation is as follows:

(1) To the reactor 26 in which the $SO_2$ reducing reaction is accomplished, there is added neither the high-temperature reducing gas 81 (i.e., the dust-free gas 6, containing combustible gases such as $H_2$ and CO, which has been heated by the heat exchanger 89 and will be introduced via the flow path switch valve 84) nor air or the oxygen-containing gas 93 (which will be introduced via the heat exchanger 91 and the flow path switch valve 70). That is, the flow path switch valves 70 and 84 are closed.

(2) Immediately after the beginning of the $SO_2$ reduction operation, air or the oxygen-containing gas 93 and the high-temperature reducing gas 81 (containing CO and $H_2$) are delivered to the reactor 27 via the flow path switch valve 65 and the flow path switch valve 85 respectively, so that regenerating reactions and combustion reactions of the combustible gases begin. At this time, a gas circulating line through the $SO_2$ reducing step and the regenerating step comprises a cycle of the reactor 26→the flow path switch valve 39→the heat exchanger 74→sulfur condenser 50→the sulfur separator 52→the blower 53→the gas line 86→the flow path switch valve 19→the reactor 27→the flow path switch valve 36→the heat exchanger 47→the gas line 48→the flow path switch valve 22→the reactor 26.

(3) Because of the regenerating reactions and the combustion reactions of the combustible gases, the gas coming from the reactor 27 scarcely contains $O_2$, and the $SO_2$-containing gas from the regenerating step is fed to the reactor 26, so that a temperature in the reactor 26 is gradually raised by the retention heat of this circulating $SO_2$ gas.

(4) When a temperature in the reactor 26 has reached a temperature of 600° to 1,000° C necessary for the $SO_2$ reducing reaction, the delivery of the high-temperature reducing gas to the reactor 27 via the flow path switch valve 85 is stopped to thereby bring the combustion to an end. The treated gas 58 is partially drawn out from the treated gas 54, i.e., the treated gas 49 coming from the $SO_2$ reducing step from which elemental sulfur has been already removed, and is then fed to the reducing step (the reactor 24), in an amount corresponding to that of gases to be added to the $SO_2$ reducing step (the high-temperature reducing gas 81 coming via the flow path switch valve 84 and air or the oxygen-containing gas 93 coming via the flow path switch valves 65, 70). On the other hand, most gas 86 of the remaining treated gas 60 is fed to the reactor 27 via the flow path switch valve 19, and a gas circulating system through the $SO_2$ reducing step and the regenerating step is established in a steady state.

With regard to the SO₂ reducing step and the regenerating step in which the steady conditions will be established in this way, characteristic points other than in FIG. 1 will be described as follows:

(1) SO₂ reducing step

An O₂ concentration in the SO₂-containing gas which will be delivered to the SO₂ reducing step is adjusted by the flow path switch valve 70 for air or the oxygen-containing gas 93, and when desired, the reactions of the formulae (19) and (8) are performed at the inlet and in the interior of the reactor 26.

Further, the circulating gas 48 which has undergone the regenerating step and which will be fed to the SO₂ reducing step is mixed with the high-temperature reducing gas 81 coming via the flow path switch valve 84, so that combustion reactions take place between air or the oxygen-containing gas 93 and the combustible components (H₂ and CO) in the high-temperature reducing gas 81, with the result that the thus generated heat is utilized to accelerate the SO₂ reducing reaction.

The combustion reactions of the combustible gases (H₂ and CO) occurs sufficiently at a gas temperature of 600° C or more owing to a contact function with a refractory material internally lined to usually protect a pipe material, but in the event that the combustion is difficult, a combustion improver such as the absorbent 28 may be brought into contact with the above-mixed gas. In such a case, the complete combustion can be attained at a gas temperature of 400° C or more.

A line, which has a flow path switch valve 87 thereon and through which the gas 86 having undergone the SO₂ reducing treatment is introduced into the circulating gas 48 from the regenerating step, is provided to adjust an SO₂ concentration in the SO₂ reducing step.

That is, since the circulating gas 48 from the regenerating step contains a part of gaseous sulfur produced by the reactions of the formulae (9) to (11) in the reactor 27, the reaction of the formula (19) occurs in the presence of O₂ at the inlet of the reactor 26 playing the SO₂ reducing step, in order to form an SO₂ gas. Therefore, the SO₂ in the gas at the inlet of the reactor 26 can be maintained at a predetermined concentration by adjusting the flow path switch valve 87, and in consequence, when a necessary volume of the gas 86 having a low SO₂ concentration, which has been subjected to the SO₂ reduction treatment, is mixed with the circulating gas 48, an SO₂ reduction operation can be stabilized.

(2) Regenerating step

The reactor 27 at the beginning of the regeneration operation is in the state in which the SO₂ reducing step has just been switched to the regenerating step, but a temperature in the reactor 27 already reaches a level necessary for the regeneration operation. Accordingly, a steady operation can be established soon therein. In the regenerating step, most gas of the SO₂ reducing gas 60 is led to the reactor 27 through the gas line 86 via the flow path switch valve 19 (for the protection of the heat exchanger 47, a small amount of the SO₂ reducing gas 60 is joined to the circulating gas 86 via a flow path switch valve 88 through the heat exchanger 47 and the gas line 67). For the period other than a time interval of the beginning of the SO₂ reduction operation and a time interval before the regeneration completion of the absorbent 28, the regenerating step can be advanced without feeding the high-temperature reducing gas 81 and air or the oxygen-containing gas 93 to the inlet side of the reactor 27.

If the regeneration of the absorbent 28 in the reactor 27 playing the regenerating step is insufficient, the high-temperature reducing gas 81 may be fed thereto via the flow path switch valve 85 in order to raise an inlet gas temperature by the combustion reactions with the combustible gases and to thereby enable the effective and sufficient regeneration.

Before the regeneration completion of the absorbent, the high-temperature reducing gas 81 and air or the oxygen-containing gas 93 is fed to the reactor 27 so as to elevate the inlet temperature of the reactor 27 up to 650° C or more, preferably 700° C or more and to thereby complete the regeneration of the absorbent 28. After going through a usual gas purge, the transition to the next step (reducing step) is made.

After the SO₂ reducing reaction and the regenerating reaction, and when the transition to each next step is made, i.e., when the reactor 26 is switched to the regenerating step and the reactor 27 is switched to the reducing step, the flow path switch valves 19 and 36 on the upstream and downstream sides of the reactor 27 are closed, and the high-temperature reducing gas 81 and a small amount of air or the oxygen-containing gas 93 are fed to the reactor 27 in order to carry out heat acquirement and purge. The gas discharged therefrom is introduced into the reactor 24 of the reducing step via the flow path switch valve 29 by the aid of a pressure balance. In this case, the high-temperature reducing gas is fed thereto in excess of a theoretical amount necessary for the combustion, so that the reactions of the formulae (20) to (22) take place and the gas purge is accelerated.

Further, as in the case of the usual operation, at the time of the completion of the SO₂ reducing step, air or the oxygen-containing gas 93 is fed to the reactor 26 in a theoretical amount necessary for the combustion of gaseous sulfur in the fed high-temperature reducing gas 81 and circulating gas 48, in order to supply the system with a heat.

With regard to a source (not shown) of the high-temperature gas 90 which passes through the heat exchanger 89 for heating the high-temperature reducing gas 81 and another source (not shown) of the high-temperature gas 92 which passes through the heat exchanger 91 for heating air or the oxygen-containing gas 64, any materials can be employed in the present invention in so far as they satisfy conditions for the heat exchange.

Figure 7:
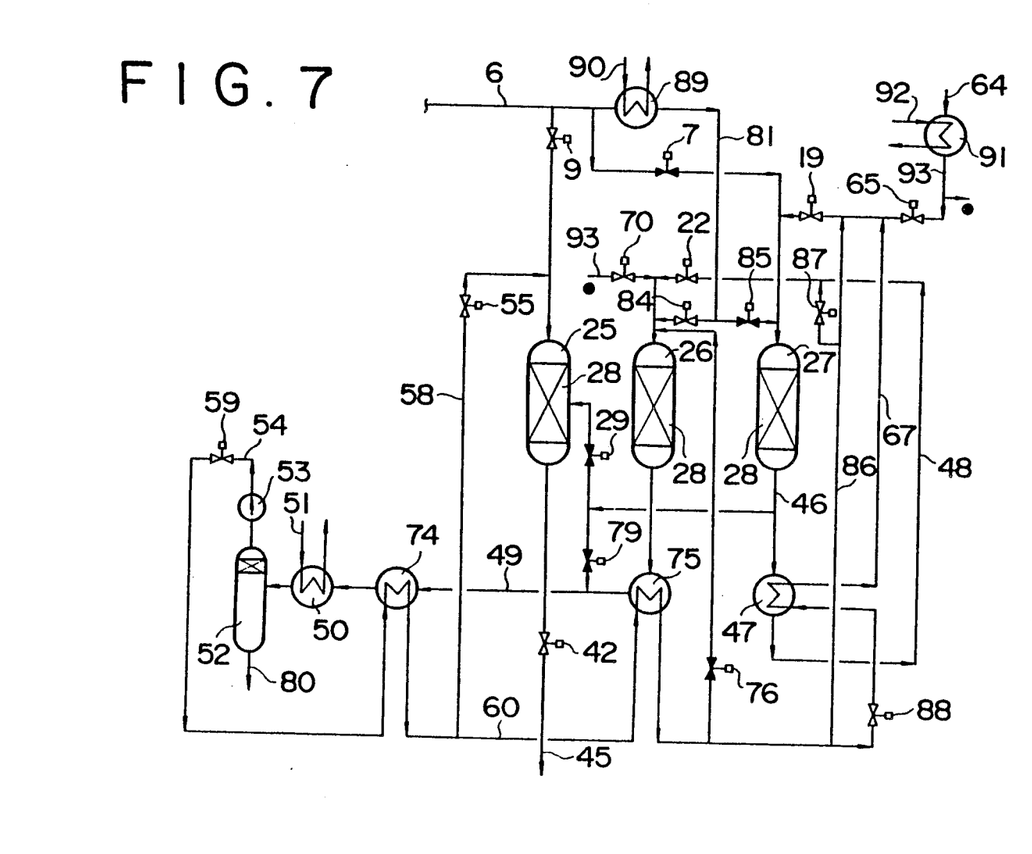

FIG. 7 shows an embodiment in which a means for introducing the high-temperature reducing gas is additionally employed in the three-reactor type in FIG. 5, and a principle of this embodiment in FIG. 7 is about the same as in FIG. 6.

In FIG. 7, the treated gas 54 from which elemental sulfur has been removed in the SO₂ reduction system is heated up to a temperature necessary for the absorption reaction by means of the heat exchanger 74, and a part of the thus heated gas 54 is fed to the reactor 25 of the absorbing step through the gas line 58 via the flow path switch valve 55 in an amount corresponding to the total amount of the high-temperature reducing gas 81 and air or the oxygen-containing gas 93 which will be introduced into the regenerating step and the SO₂ reducing step. On the other hand, the remaining treated gas 60 is further heated by the heat exchanger 75 and is then introduced into the regenerating step.

In the embodiment shown in FIG. 7, the single tower of reactor 27 is used for both the regeneration and the reduction, and on finishing the regenerating step, the flow path switch valves 7, 76 and 79 which have been closed during the regenerating step are opened and the valves 19, 22 and 65 are closed, so that a small amount of the dust-free gas 6 is led into the reactor 27 via the flow path switch valve 7, thereby switching the regenerating step to the reducing step.

The step operations of the respective reactors 25, 26 and 27 are about the same as in FIG. 5, and the embodiment in FIG. 7 is the combination of the constitution in FIG. 5 and the mechanism for adding the high-temperature reducing gas 81 the principle of which is similar to that of FIG. 6.

Figure 8:
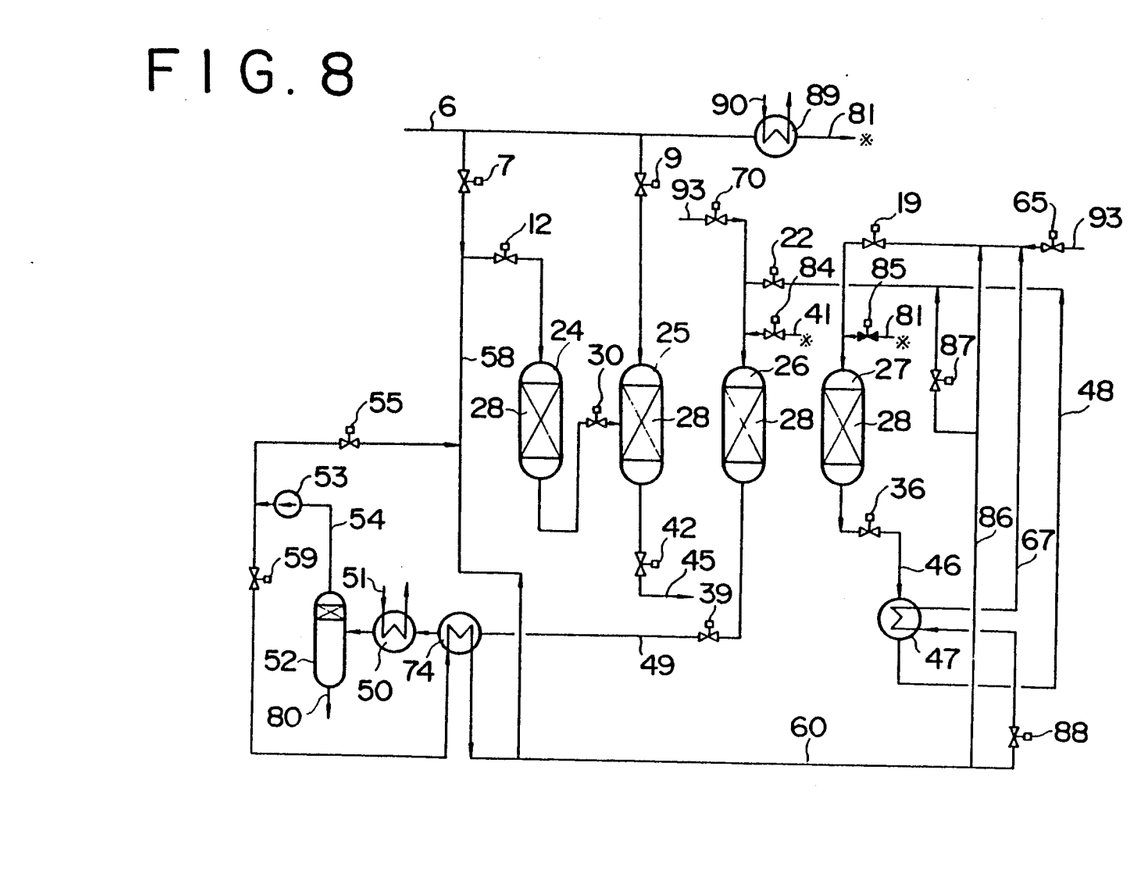
FIG. 8 is an embodiment of the invention for obtaining an estimation of the effect of the present invention as summarized in Table 1.

Next, referring to FIG. 8, with regard to two cases of a coal having a high content of sulfur (in a gas prepared by gasifying the coal, a concentration of $H_2S$ is 1,500 ppm) and another coal having a low content of sulfur (in a gas prepared by gasifying the coal, a concentration of $H_2S$ is 300 ppm), there are estimated temperatures, flow rates and sulfur concentrations at the steady state in the method of the present invention (as a means for securing a predetermined temperature in the $SO_2$ reducing step, the addition of the high-temperature reducing gas is taken) on the basis of the following assumptions:

(1) An amount of the gas 6 prepared by gasifying the coal is 800,000 $Nm^3/h$, an $H_2S$ concentration in the purified gas is 24 ppm. The gas 6 is fed to the reducing step (the reactor 24) in an amount of 40,000 $Nm^3/h$, to the $SO_2$ reducing step (the reactor 26) in an amount of 4,200 $Nm^3/h$ as the high-temperature reducing gas 81, and to the absorbing step (the reactor 25) in a remaining amount. In the gas 6, a CO concentration is 25.1 vol % and an $H_2$ concentration is 9.1 vol %.

(2) The gas 49 which has been subjected to the $SO_2$ reducing step is cooled gradually through the heat exchanger 74 and the sulfur condenser 50. In the sulfur separator 52, its temperature becomes about 180° C., so that elemental sulfur is recovered and removed. The elemental sulfur-free treated gas 54 is heated up to 650° C in the heat exchanger 74, and a part of the gas 54 is introduced into the reactor 24 of the reducing step (an amount of the gas 58 corresponding to the total amount of the high-temperature reducing gas 81 and air or the oxygen-containing gas 93 which will be fed to the regeneration system and the $SO_2$ reduction system is mixed with the gas coming through the blower 53 in order to adjust the gas temperature to a level required in the absorbing step, for example, 400° C). The remaining gas 60 is fed to the reactor 27 of the regeneration step, thereby forming a circulating line.

(3) A flow rate of the circulating gas 60 from the $SO_2$ reducing step to the regenerating step is 120,000 $Nm^3/h$, and its $SO_2$ concentration is 3 vol % in the high sulfur content coal and is 1 vol % in the low sulfur content coal. The results of the estimation are set forth in Table 1.

TABLE 1

| | Estimation Results Regarding Gas Purification | |
|---|---|---|
| Item | High sulfur content coal ($H_2S$ 1,500 ppm) | Low sulfur content coal ($H_2S$ 300 ppm) |
| Gas temp. at inlet of $SO_2$ reducing step | 750 to 770° C | 720 to 740° C |
| Air flow rate into $SO_2$ reducing step | 11,120 $Nm^3/h$(dry) 11,176 $Nm^3/h$(wet) | 4,864 $Nm^3/h$(dry) 4,888 $Nm^3/h$(wet) |
| Gas flow rate from | 133,043 $Nm^3/h$ | 128,067 $Nm^3/h$ |

TABLE 1-continued

| | Estimation Results Regarding Gas Purification | |
|---|---|---|
| Item | High sulfur content coal ($H_2S$ 1,500 ppm) | Low sulfur content coal ($H_2S$ 300 ppm) |
| $SO_2$ reducing step Gas temp. at outlet of $SO_2$ reducing step | 800 to 820° C | 710 to 730° C |
| Gas temp. at outlet of regenerating step | 620 to 640° C | 620 to 640° C |
| Amount of recovered elemental sulfur | 1683 kg/h | 309 kg/h |
| Amount of gas drawn into reducing step | 13,040 $Nm^3/h$ | 8,067 $Nm^3/h$ |

It can be understood from the estimation results that an amount of the high-temperature reducing gas 81 consumed in the $SO_2$ reducing step is as small as about 0.5% of the introduced gas 6, and therefore an advantage of the gas temperature rise by the combustion reactions with air is greater than an economical loss of the gas purification. Further, in the case that an $H_2S$ concentration in the gas 6 is lower, or in the case that an amount of the gas 6 to be treated is small, a load of the $SO_2$ reducing step falls and a low $SO_2$ reduction reaction is acceptable, with the result that an amount of the air or the oxygen-containing gas to be introduced can be decreased. Furthermore, when the $H_2S$ concentration is low, or when an amount of the gas 6 is small, a relatively long absorbing time is taken in the reactor 25, so that an amount of recovered elemental sulfur per time in the $SO_2$ reducing step is small.

In order to cope with various concentrations of the sulfur compounds in the gas 6, it is enough to only adjust a temperature of the $SO_2$ reducing reactions in the $SO_2$ reducing step and an $SO_2$ concentration in the circulating gas, and even when the load varies, the operation is very easy.

For the purpose of evaluating an $SO_2$ reducing reactivity, tests are carried out, altering gas temperatures and SV values by the use of a lattice-like honeycomb absorbent (pore diameter 3.8 mm and wall thickness 1.1 mm) containing 20 wt % of $Fe_2O_3$.

A composition of each sample gas is that $SO_2$ is 3 mol %, $H_2O$ is 0.5 mol % and the balance is $N_2$. Two inlet gas temperatures of 700° and 800° C are combined with three SV values of 400, 800 and 2,300 $H^{-1}$. Then, $SO_2$ conversions [{inlet $SO_2$ concentration (mol %) − outlet $SO_2$ concentration (mol %)}/inlet $SO_2$ concentration (mol %)×100] on the gas side are calculated, and the results are set forth in Table 2.

TABLE 2

| Conversion of $SO_2$ Gas | | | | |
|---|---|---|---|---|
| | Run No. | | | |
| | 1 | 2 | 3 | 4 |
| Conditions of Reaction | | | | |
| Inlet Gas Temp. (°C) | 700 | 700 | 800 | 800 |
| SV Value ($H^{-1}$) | 800 | 400 | 400 | 2,300 |
| $SO_2$ Conversion (%) on Gas Side | 9.2 | 10.0 | 14.9 | 4.5 |

By the use of the formula (10) in which FeS is reacted with $SO_2$ to form elemental sulfur, values of equilibrium conversion in the case of the 3 mol % $SO_2$ gas are calculated. The results are 5.31% at 600° C., 9.57% at 700° C, 15.3% at 800° C and 23.3% at 900° C. The above test results indicate that an amount of the produced elemental sulfur substantially reaches a level of the equilibrium conversion at SV values of 400 $H^{-1}$ and 800

$H^{-1}$. On the other hand, when the SV value is 2,300 $H^{-1}$, its amount is as small as about 30% of the equilibrium conversion. In consequence, it is apparent that employing the excessively high SV value is economically unpreferable.

According to the above estimation, in the case that a flow rate of the introduced original gas is 800,000 $Nm^3/h$ (which corresponds to electric power generation of 500 MW), a flow rate of the circulating gas in the $SO_2$ reducing step is about 130,000 $Nm^3/h$ (about 16% of that in the absorbing step). Judging from the fact that the absorbing step is usually operated at the SV value of 1,000 to 3,000 $H^{-1}$, the SV value in the $SO_2$ reducing step can be set to a level of about 150 to about 500 $H^{-1}$. Under these conditions, elemental sulfur can be produced by the $SO_2$ reduction reactions at a value which is very close to the equilibrium conversion. This detailed estimation supports the usefulness of the present invention.

The present invention has the following functional effects:

(1) In the treatment of the regenerated $SO_2$ gas, elemental sulfur can be recovered only by the absorbent for the sulfur compounds without using a reducing agent such as a coal or a coke, a reducing gas such as CO or $H_2$, or a reducing catalyst of a Co-Mo series or the Claus catalyst.

(2) In the fixed-bed system, any transition of the respective steps can be smoothly achieved without any pressure release and without any operation under a reduced pressure.

(3) Although there is a great temperature gap between the absorbing step and the regenerating step, a temperature of the circulating gas can be raised up to a level necessary for the absorbent regeneration by the interposition of the $SO_2$ reducing step therebetween. The concentrations of $SO_2$ and $SO_3$ in the gas which will be introduced into the regenerating step can be lowered to about 1/7 to about ⅔ of those of the conventional technique in the partial treatment of the regenerated gas, and about 1/10 to about ½ of them in the whole treatment, with the result that the durability of the absorbent can be improved and the corrosion of the apparatus can be inhibited effectively.

(4) Since the $SO_2$ reducing step can convert the $SO_2$ gas coming from the regenerating step into elemental sulfur and then can recover the sulfur, an amount of air for the regeneration operation used in the $SO_2$ reducing step and the regeneration step can be decreased as much as about 40 to about 50% of that in the conventional case. As a result, a consumption of electric power can be saved remarkably (it is possible to save about 20% of the electric power consumption in the case of the conventional dry gas purifying apparatus).

(5) Since the high-temperature reducing gas containing the combustible gases (CO, $H_2$ and the like) and air or the oxygen-containing gas necessary for their combustion are fed to the inlet of the $SO_2$ reducing step, the regeneration system and the $SO_2$ reduction system are more economical.

We claim:

1. In a method for purifying a reducing gas containing sulfur compounds by continuously repeating the steps of reducing a regenerated absorbent with said reducing gas until concentrations of the reducing gases being treated have become uniform on the upstream and downstream sides of said absorbent, and removing sulfur compounds contained in said reducing gas by said absorbent, the improvement which comprises using at least three reactors filled with said absorbent to carry out, in this order, the steps of reduction of the absorbent, absorption of the sulfur compounds from the reducing gas, reduction of $SO_2$ in an $SO_2$-containing gas and regeneration of the absorbent, and wherein a gas from the regeneration step is circulated to the $SO_2$ reduction step to convert $SO_2$ therein to sulfur and recovering said sulfur as liquid sulfur, and dividing the gas from the $SO_2$ reduction step which contains residual unconverted $SO_2$ into two portions and feeding one portion to the absorbent reduction step and feeding the remaining portion to the absorbent regeneration step.

2. In a method for purifying a reducing gas containing sulfur compounds by continuously repeating the steps of reducing a regenerated absorbent with said reducing gas until concentrations of the reducing gases being treated have become uniform on the upstream and downstream sides of said absorbent, and removing sulfur compounds contained in said reducing gas by said absorbent, the improvement which comprises using at least three reactors filled with said absorbent to carry out, in this order, the steps of reduction of the absorbent, absorption of the sulfur compounds from the reducing gas, reduction of $SO_2$ in an $SO_2$-containing gas, and regeneration of the absorbent, and wherein a gas from the regeneration step is circulated to the $SO_2$ reduction step to convert $SO_2$ therein to sulfur and recovering said sulfur as liquid sulfur, and dividing the gas from the $SO_2$ reduction step which contains residual unconverted $SO_2$ into two portions and feeding one portion to the absorbent reduction step and feeding the remaining portion to the absorbent regeneration step and adding reducing gas to the gas being circulated to the $SO_2$ reduction step from the regeneration step to raise the temperature of the circulated gas to a level necessary for said $SO_2$ reducing step by combustion reactions with oxygen in the circulated gas.

* * * * *